J. H. WAGENHORST.
DEMOUNTABLE RIM AND MEANS FOR FASTENING SAME.
APPLICATION FILED OCT. 24, 1919.

1,397,565.

Patented Nov. 22, 1921.

Inventor,
J. H. Wagenhorst.

UNITED STATES PATENT OFFICE.

JAMES H. WAGENHORST, OF JACKSON, MICHIGAN.

DEMOUNTABLE RIM AND MEANS FOR FASTENING SAME.

1,397,565.   Specification of Letters Patent.   Patented Nov. 22, 1921.

Application filed October 24, 1919. Serial No. 332,881.

*To all whom it may concern:*

Be it known that I, JAMES H. WAGENHORST, a citizen of the United States, residing at Jackson, in the county of Jackson and State of Michigan, have invented a certain new and useful Improvement in Demountable Rims and Means for Fastening Same, of which the following is a full, clear, and exact description, reference being had to the accompanying drawings.

This invention relates generally to a demountable tire carrying rim together with means for fastening said demountable rim upon the fixed rim of a wheel body. The objects of the invention are to provide an exceedingly cheap and simple form of demountable tire carrying rim and fastening means specially adapted for use in connection with channeled sheet metal fixed rims. Another object of the invention is to provide a fastening means for the demountable tire carrying rim which shall not only serve to secure the demountable rim upon the fixed rim but also serve as a driving connection between said fixed and demountable rim, said fixed and demountable rims being of such a nature as to coöperate with said clamping means for bringing about this double functioning of the clamping means.

The invention consists in the novel features of construction hereinafter fully described and pointed out in the claims.

Figure 1:
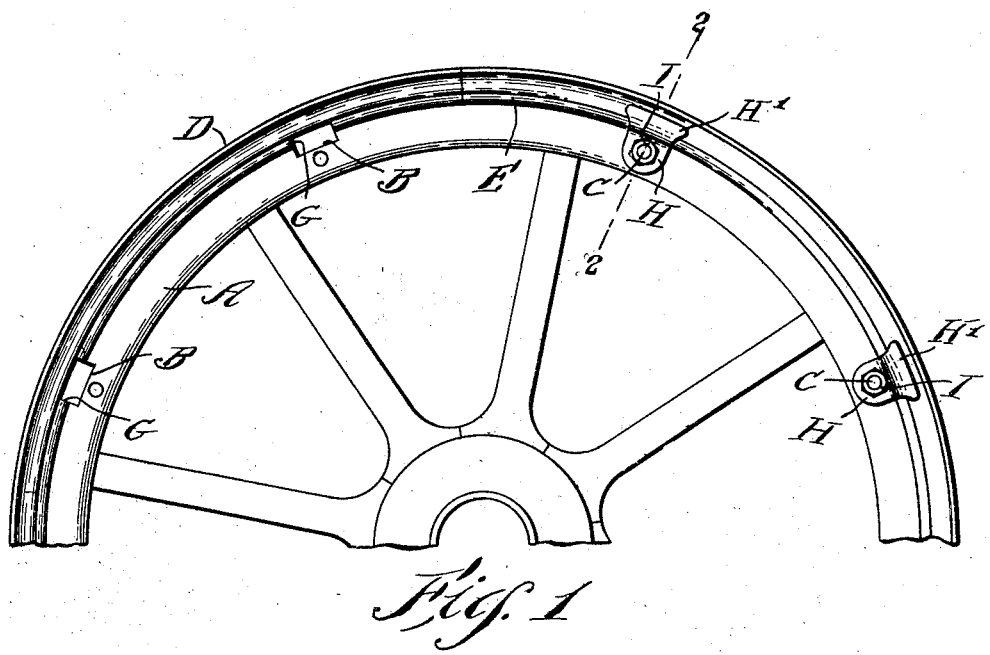
Figure 2:
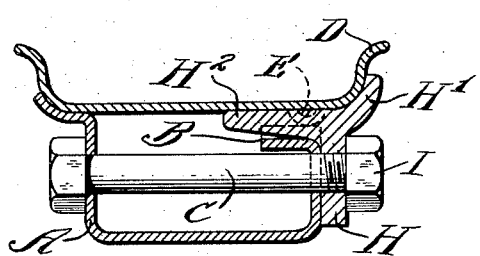

In the drawings forming a part of this specification Figure 1 is a face view of one half of a wheel body together with one half of a demountable tire carrying rim secured thereon in accordance with one embodiment of my invention; Fig. 2 is a sectional view on the line 2—2 of Fig. 1; and Fig. 3 is a similar view showing a slight modification.

In the practical embodiment of my invention I employ a channeled fixed rim A, the outer flange of which is somewhat shorter than the inner flange and at definite points this outer flange has its outer edge depressed, as most clearly shown at B. Transverse bolts C are passed axially through the fixed rim in line with the depressions in the outer flange thereof. The tire carrying rim D may be of the straight side or clencher type and is preferably transplit and is provided with an inwardly extending rib upon the inner face of the base. This inwardly projecting rib may be in the form of an inrolled bead as shown at E or may be in the form of an integral rib as shown at F and this bead or rib is so positioned that when the demountable tire carrying rim is placed upon the fixed rim, the said inwardly projecting bead or rib will engage the outer flange of the fixed rim. The inwardly projecting bead or rib is removed at definite points as shown at G and in placing the demountable rim upon the fixed rim, it is so placed that the spaces G will be in line with the depressions in the flange of the fixed rim.

For the purpose of fastening the demountable tire carrying rim of this type upon the fixed rim of the hereinbefore described construction, I employ clamping members H which are arranged upon the bolts, and nuts I are employed in connection with the bolts to bind all of the parts firmly together. The clamping members have portions H' which engage the outer side of the demountable tire carrying rim and also elongated portions $H^2$ which fit axially between the fixed and demountable tire carrying rims, these elongated portions being shaped to engage the depressions in the fixed rim and fit into the recesses or notches or points of removal of the demountable tire carrying rim and extending as they do between the fixed and demountable rim they hold the clamp as a whole, so that the full and direct pull of the bolt is obtained. It will also be understood that these portions $H^2$ do not function as a wedge in completing the fastening operation but operate as a positioning and driving connection between the fixed and demountable rims while the portion H' serves to maintain the demountable tire carrying rim in its proper axial position upon the fixed rim and keeps the same properly tensioned.

Figure 3:
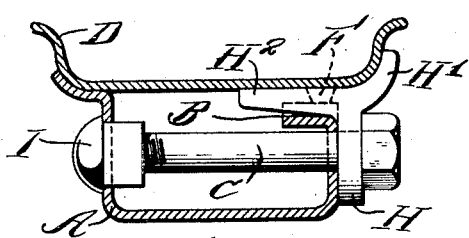

In Fig. 3 I have shown a slight modification, the integral rib being solid instead of an inrolled bead and the nut instead of being arranged upon the outer end of the bolt is positioned in the inner leg of the fixed rim and the bolt is screwed into the same, the head of said bolt contacting with the inwardly extending portion of the clamping member.

By means of the above described construction, driving lugs such as now commonly employed can be dispensed with and also separate or independent means for locking the ends of the rim together. It will thus be seen that by means of the fixed and demountable rims constructed as herein described, and coöperating with the type of clamping member herein shown, I provide a simple and efficient means for fastening a demountable tire carrying rim upon a wheel body and also it will be noted that the aforesaid means can be quickly and easily operated to mount or demount the rim and that when once in place will effectively carry out all of the functions for which they are intended.

Having thus described my invention, what I claim is:—

1. The combination with a channeled sheet metal fixed rim, the outer flange of which is depressed at definite points, of bolts passing through said fixed rim in line with the said depressions, a demountable tire carrying rim having an inwardly extending rib upon the inner face of the base thereof, said rib being removed at definite points, said demountable tire carrying rim being adapted to be placed upon said fixed rim so that the points of removal of the rib upon the demountable rim will be in alinement with the depressions in the flange of the fixed rim and clamping members arranged upon the bolts, said clamping members having one portion adapted to engage the demountable tire carrying rim at the side thereof and also having a member adapted to engage the depression in the fixed rim and the demountable tire carrying rim at the point where the rib thereof is removed together with means for binding said parts together.

2. The combination with a demountable tire carrying rim having an inrolled bead, said bead being removed at definite points, of a channeled sheet metal fixed rim, the outer flange of which is depressed at definite points, the demountable rim being adapted to be arranged upon the fixed rim so that the points of removal in the bead will be in line with the depressions in the flange of the fixed rim, bolts passing through the fixed rim in line with the depressions, and clamping members arranged upon said bolts, said clamping members having one portion adapted to pass between the fixed and demountable rims and also a portion adapted to engage the side of the demountable tire carrying rim together with means for binding said parts together.

3. The combination with a channeled sheet metal fixed rim, the inner leg of which is provided with a continuous flange, the outer leg of said fixed rim being depressed or recessed at definite points, of bolts passing through said fixed rim in line with said depressions or recesses, a demountable tire carrying rim arranged upon said fixed rim, its inner edge being adapted for contact with the continuous flange upon the inner leg of said fixed rim; and clamping members arranged upon the bolts, said clamping members having each an axial portion adapted to engage the depression or recess in the fixed rim, an outwardly extending portion adapted to engage the side of the demountable tire carrying rim and an inwardly extending apertured portion adapted to receive the bolt, and means for binding said parts together.

4. The combination with a sheet metal fixed rim, the inner leg of which has a continuous flange, of bolts passing through said fixed rim, a demountable tire carrying rim having an inwardly projecting portion adjacent the outer side, said inwardly projecting portion being recessed at definite points, and clamping members arranged upon the bolts, said clamping members having each a portion adapted to engage the recessed portion of the demountable rim, a portion adapted to engage the outer side of said demountable rim, and an apertured portion adapted to fit upon the bolt, together with means for binding said parts together, said demountable rim being arranged upon the fixed rim in such a manner as to bring the recessed portion of the inwardly projecting part thereof in alinement with the bolts.

In testimony whereof, I hereunto affix my signature.

JAMES H. WAGENHORST.